(12) United States Patent
Kladny

(10) Patent No.: US 11,999,080 B2
(45) Date of Patent: Jun. 4, 2024

(54) MACHINE FOR RECYCLING TYRES

(71) Applicant: Tyre Recycling Solutions SA, Préverenges (CH)

(72) Inventor: Pierre Kladny, Colombier (CH)

(73) Assignee: Tyre Recycling Solutions SA, Préverenges (CH)

( * ) Notice: Subject to any disclaimer, the term of this patent is extended or adjusted under 35 U.S.C. 154(b) by 333 days.

(21) Appl. No.: 17/631,660

(22) PCT Filed: Jul. 17, 2020

(86) PCT No.: PCT/IB2020/056722
§ 371 (c)(1),
(2) Date: Jan. 31, 2022

(87) PCT Pub. No.: WO2021/019357
PCT Pub. Date: Feb. 4, 2021

(65) Prior Publication Data
US 2022/0274292 A1    Sep. 1, 2022

(30) Foreign Application Priority Data

Jul. 31, 2019 (CH) ..................... 00977/19

(51) Int. Cl.
*B29B 17/04* (2006.01)
*B26F 3/00* (2006.01)
*B29B 17/00* (2006.01)

(52) U.S. Cl.
CPC .......... *B29B 17/0404* (2013.01); *B26F 3/004* (2013.01); *B29B 2017/0015* (2013.01); *B29B 2017/0021* (2013.01); *B29B 2017/0428* (2013.01)

(58) Field of Classification Search
CPC ............. Y10T 83/0453; Y10T 83/2066; Y10T 83/2068; B26B 17/0404;
(Continued)

(56) References Cited

U.S. PATENT DOCUMENTS 5,115,983 A    5/1992  Rutherford, Sr.
5,155,983 A *  10/1992 Sheehan ............... G01S 15/101
                                                     56/DIG. 15
(Continued)

FOREIGN PATENT DOCUMENTS

CH      712201 A1   9/2017
CH      714352 A1   5/2019
(Continued)

OTHER PUBLICATIONS

International Search Report mailed Sep. 24, 2020, in connection with Application No. PCT/IB2020/056722.
(Continued)

*Primary Examiner* — Phong H Nguyen
(74) *Attorney, Agent, or Firm* — Wolf, Greenfield & Sacks, P.C.

(57) ABSTRACT

Machine for recycling tyres by recovering the tyre tread rubber using waterjets. The machine comprises a loading unit for loading a tread, a processing unit, the processing unit comprising a framework comprising a preprocessing zone, a processing zone and a postprocessing design. The preprocessing zone drives a cut tread towards the processing zone. The processing zone comprises a processing module designed to direct a waterjet onto the recovered tread. The preprocessing zone comprises motorized guide rollers and presence sensors arranged in such a way as to allow a second tread to catch up with a first tread in such a way as to reduce, to the point of closing up, the space between two treads.

15 Claims, 7 Drawing Sheets

(58) Field of Classification Search
CPC .... B26B 2017/0015; B26B 2017/0021; B26B 2017/0428; B26F 3/004
See application file for complete search history.

(56) References Cited

U.S. PATENT DOCUMENTS

| | | | |
|---|---|---|---|
| 5,341,996 | A | 8/1994 | Rutherford, Sr. |
| 9,156,192 | B2 | 10/2015 | Butler et al. |
| 2011/0113940 | A1 | 5/2011 | Florean |
| 2011/0168818 | A1* | 7/2011 | Verri ................. B29B 17/02 |
| | | | 241/101.2 |
| 2012/0223167 | A1* | 9/2012 | Butler ................. B02C 25/00 |
| | | | 241/33 |
| 2020/0130214 | A1 | 4/2020 | Ahlgren |

FOREIGN PATENT DOCUMENTS

| | | |
|---|---|---|
| CN | 102284469 A | 12/2011 |
| CN | 102581987 B | 1/2014 |
| CN | 103660074 A | 3/2014 |
| CN | 108522724 A | 9/2018 |
| CN | 108527724 A | 9/2018 |
| EP | 1 305 147 B1 | 12/2004 |
| FR | 2 798 090 A1 | 3/2001 |
| JP | S56-89538 A | 7/1981 |
| JP | 22005-046758 A | 2/2005 |
| WO | WO 2001/017733 A2 | 3/2001 |
| WO | WO 2003/057442 A1 | 7/2003 |
| WO | 2014/013233 A1 | 1/2014 |
| WO | WO 2015/162443 A1 | 10/2015 |
| WO | WO 2019/153839 A1 | 8/2019 |

OTHER PUBLICATIONS

Holka et al., Recycling of Car Tires by Means of Waterjet Technologies. AIP Conference Proceedings 1822, 02008. Mar. 3, 2017. 10 Pages. https://doi.org/10.1063.1.4977682.

* cited by examiner

MACHINE FOR RECYCLING TYRES

RELATED APPLICATIONS

This Application is a national stage filing under 35 U.S.C. 371 of International Patent Application Serial No. PCT/IB2020/056722, filed Jul. 17, 2020. Foreign priority benefits are claimed under 35 U.S.C. § 119(a)-(d) or 35 U.S.C. § 365(b) of Swiss application number 00977/19, filed Jul. 31, 2019.

BACKGROUND

The present invention relates to a machine for recycling tyres. In particular, the present invention relates to the recovery of rubber from a tread using water-jet technology.

It is known from the prior art that high-pressure jet tyre mills are used to produce rubber powders.

CH712201 describes a tyre cutting machine. Such a machine gives complete satisfaction in everyday use, but can be improved to ensure a greater yield and better performance.

The object of the present invention is to overcome these imperfections so as to provide a very high throughput and obtain a greater quantity of powder.

Another aim of the present invention is to propose a new machine for recovering rubber from tyre treads using ultra-high-pressure water jet technology, the machine being able to process complete tyres or even tyres previously cut into three parts, i.e. two sidewalls and a tread cut lengthwise and transversely at its ends.

SUMMARY

In accordance with the invention, a machine for recycling tyres by recovering rubber from tyre treads using water jets comprises a loading unit for loading a tyre tread, the loading unit having a support for positioning a tread. The machine comprises a processing unit for an elongated tyre tread, the processing unit having a framework comprising a preprocessing zone, a processing zone and a postprocessing zone. The preprocessing zone includes a first upper module and a first lower module pressing on either side against each side of a flat, cut tread recovered from the loading unit to convey it toward the processing zone. The processing zone includes a processing module comprising at least one three-dimensionally displaceable and optionally orientable nozzle configured to direct a water jet onto a recovered tread. The machine also comprises a drainage zone having means for recovering material eroded from a tread and water sprayed from the nozzle. An automatic control system governs the machine parameters, in particular the jet force of the nozzle, the feed rate of the tread, and allows the variation in tread thickness to be managed by acting on the positioning of the processing modules. Detector cells are configured to detect the presence of a tread and its variations in width and thickness for switching the processing unit on or off.

The loading unit is configured for loading a tyre with tread and sidewalls or for loading a tread that is separated from a tyre but not cut into sections, the loading having a support for positioning a tyre or an uncut tread. The loading unit has an automatic feeding device configured to feed a tyre or tread to a cutting unit, said cutting unit having a sliding cutting device configured to transversely cut a tyre or tread fed to the cutting unit by the automatic feeding device. The preprocessing zone further comprises motorized guide rollers and presence sensors configured to allow a second tread to catch up with a first tread in such a way as to reduce, to the point of closing up, the space between two treads.

In one embodiment, the processing zone comprises a curved rigid plate wherein said curvature is opposite to the natural curvature of the tread, said curved rigid plate representing an inflection point between the curvature of the preprocessing zone and the postprocessing zone.

Preferably, the tread cutting device, when said tread is separated from its sidewalls, comprises an upper arm and a lower arm, the upper or lower arm carrying at one of its ends a pair of coaxial discs spaced apart from each other, the other upper or lower arm carrying a substantially circular blade arranged between said discs, said cutting device sliding to transversely cut the tread when said tread is separated from its sidewalls.

In one embodiment, each processing module comprises a nozzle configured to process a specific width of tread.

In one embodiment, the drainage zone of the processing unit comprises a recovery tank.

Preferably, the loading unit includes a cleaning device comprising a spray of a liquid cleaning the tread of impurities present on said tread.

In one embodiment, the preprocessing zone includes a device for heating, or any kind of physical treatment, of the tread in order to weaken the rubber and make it easier to extract.

In one embodiment, the preprocessing zone includes a device for cooling, or any kind of physical treatment, of the tread, for example by cryogenics, in order to weaken the rubber and make it easier to extract.

Other techniques such as the use of ultrasound, or any kind of mechanical waves, microwaves, or any kind of electromagnetic waves, can be used in order to weaken the rubber and make it easier to extract.

In one embodiment, the machine comprises a module for separating the sidewalls from a tyre.

According to this embodiment, the tyre sidewall separation module includes a cleaning device comprising a spray of a liquid cleaning the tread of impurities present on said tread.

Also according to this embodiment, the tyre sidewall separation module comprises a tyre bead metallic wire extractor. Preferably, the pressure of the water jets from the nozzles is between 1000 and 3000 bar and the size of the recovered rubber powder is mostly less than 600 micrometres.

BRIEF DESCRIPTION OF DRAWINGS

The features of the invention will become clearer on reading the description of an embodiment, given solely by way of example and in no way limiting, by reference to the schematic figures, in which.

DETAILED DESCRIPTION

Figure 1:
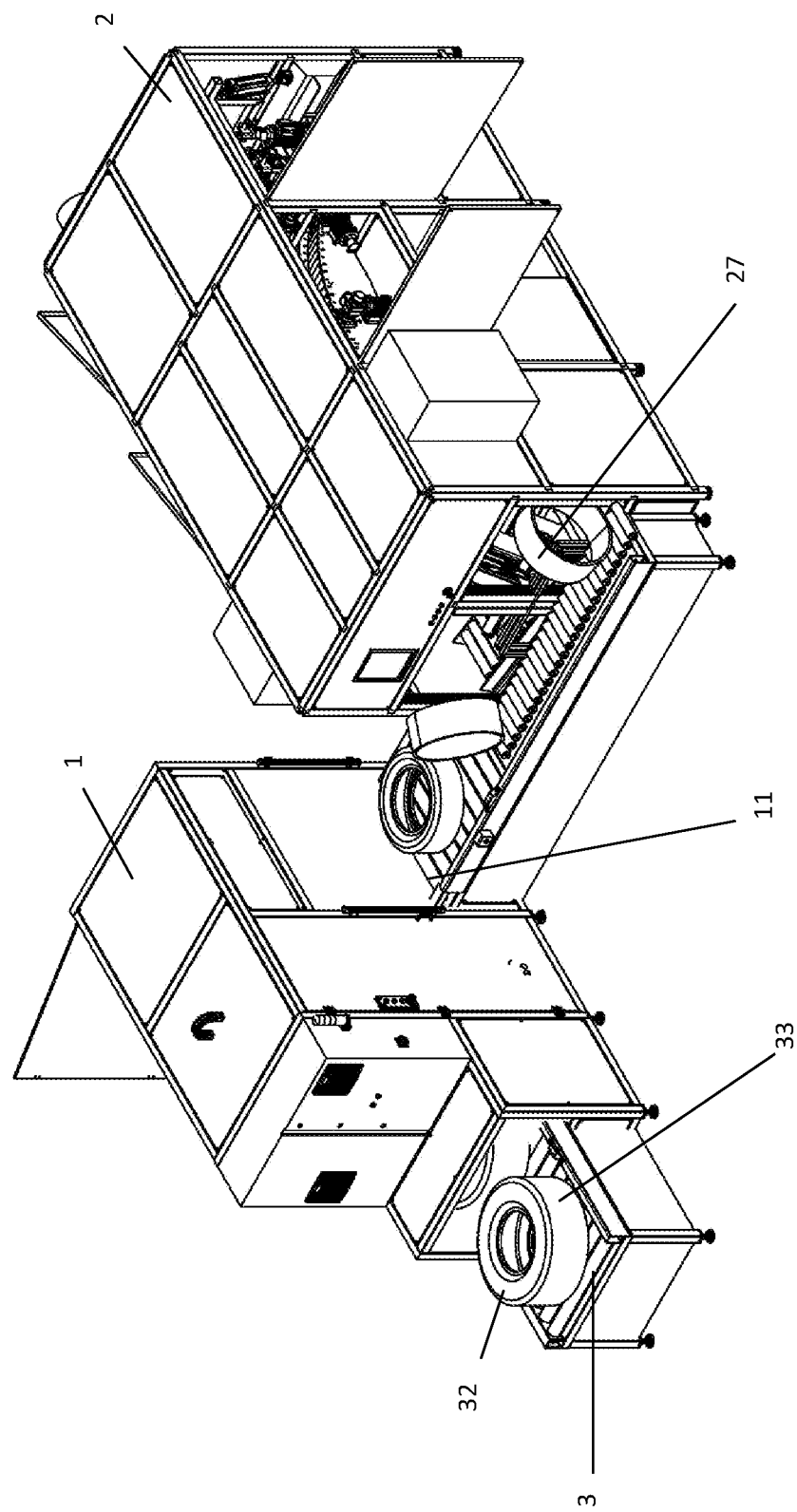
FIG. 1 shows a perspective view of a machine according to the present invention.
Figure 2:
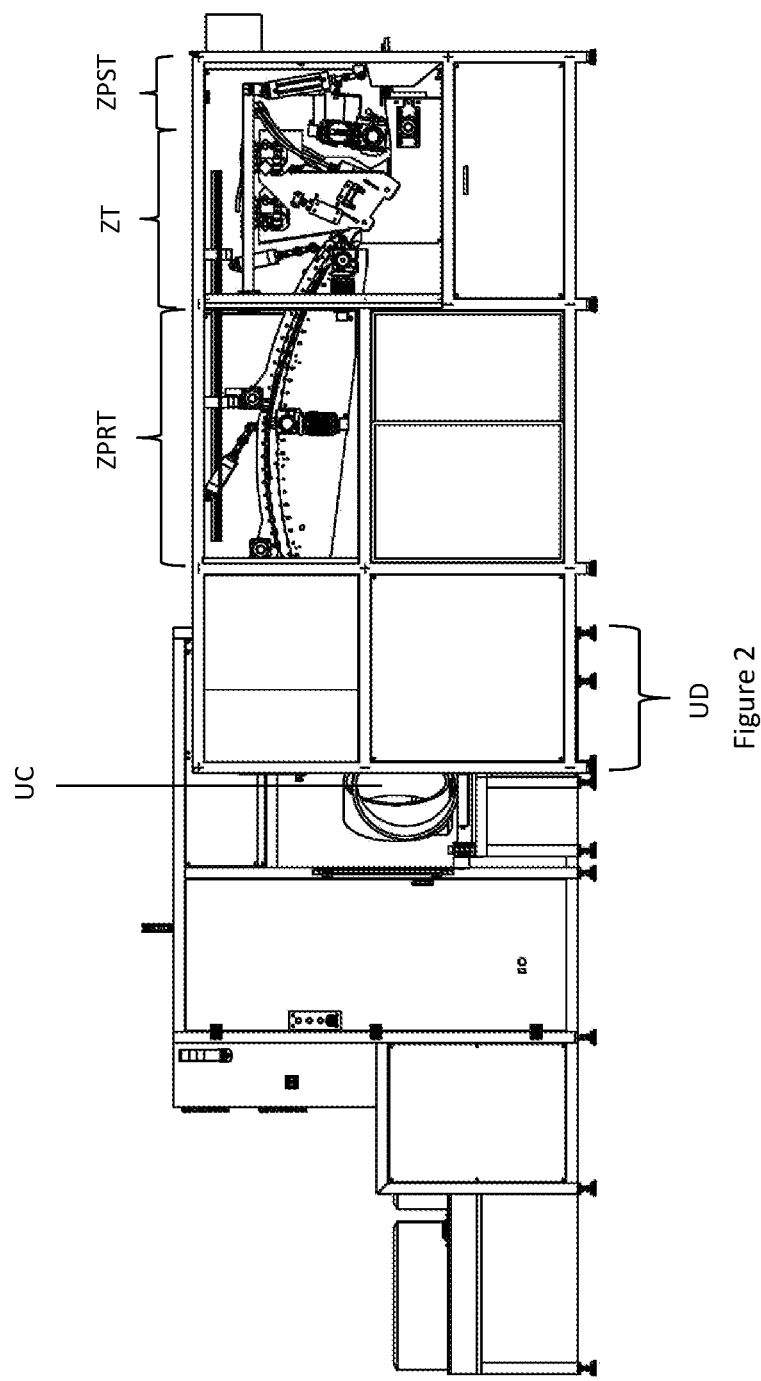
FIG. 2 shows a side view of a machine according to the present invention.

The example shown in FIGS. 1 to 8 represents a machine for recycling tyres by recovering rubber from tyre treads using water jets, wherein said machine comprises:

- a separation module 1 for separating the sidewalls 32 from a tyre;
- a loading unit UC for loading a separated tyre tread, the loading unit comprising a support for positioning a tread;
- a processing unit for processing an elongated and separated tyre tread 27, the processing unit comprising a framework comprising a preprocessing zone ZPRT, a processing zone ZT and a postprocessing zone ZPST:
  - said pre-processing zone ZPRT comprising a first upper module and a first lower module pressing on either side against each of the faces of a flat, cut tread 27 recovered from the loading unit UC to drive it towards the processing zone ZT,
  - said processing zone ZT comprising a processing module BT1, BT2 including at least one three-dimensionally displaceable and optionally orientable nozzle 28 configured to direct a water jet onto a recovered tread 27;
- a drainage zone having means for recovering material eroded from a tread 27 and water sprayed from the nozzle 28;
- an automatic control unit governing the machine parameters, in particular the jet force of the nozzle 28, the feed rate of the tread 27, and making it possible to manage the variation in the thickness of the tread 27 by acting on the positioning of the processing modules BT1, BT2; and
- detector cells configured to detect the presence of a tread 27 and its variations in width and thickness for switching the processing unit UT on or off.

The loading unit UC is configured for loading a tyre with a tread separated from a tyre but not cut into sections, the loading unit UC comprising a support for positioning an uncut tread.

The loading unit UC comprises an automatic feeding device arranged to convey a tread to a cutting unit UD, said cutting unit UD having a sliding cutting device 15 configured to transversely cut a tread fed to the cutting unit by the automatic feeding device.

The preprocessing zone ZPRT further comprises motorized guide rollers 17, 18, 19 and presence sensors configured to allow a second tread 27 to catch up with a first tread 27 in such a way as to reduce, to the point of closing up, the space between two treads 27.

As shown in FIG. 1, a complete, uncut tyre is loaded horizontally into a first tyre sidewall and tread separation unit. On the transition belt, the sidewalls are separated from the closed tread, which is loaded onto the rollers to be conveyed to a machine for recovering rubber using high-pressure water jet technology.

The loading zone of this first tyre sidewall and tread separation unit can receive a horizontal tyre regardless of its size, with the handling belt 11 allowing the sidewalls to be removed from the tread before it is fed into the machine for recovering rubber using water jet technology. This operation can be automated by means of an additional automatic unit not shown.

The machine is switched on and the operating parameters are set via a display of a digital control system integrated in the casing of the cutting machine 1 and in the sealed processing machine casing 2.

Figure 3:
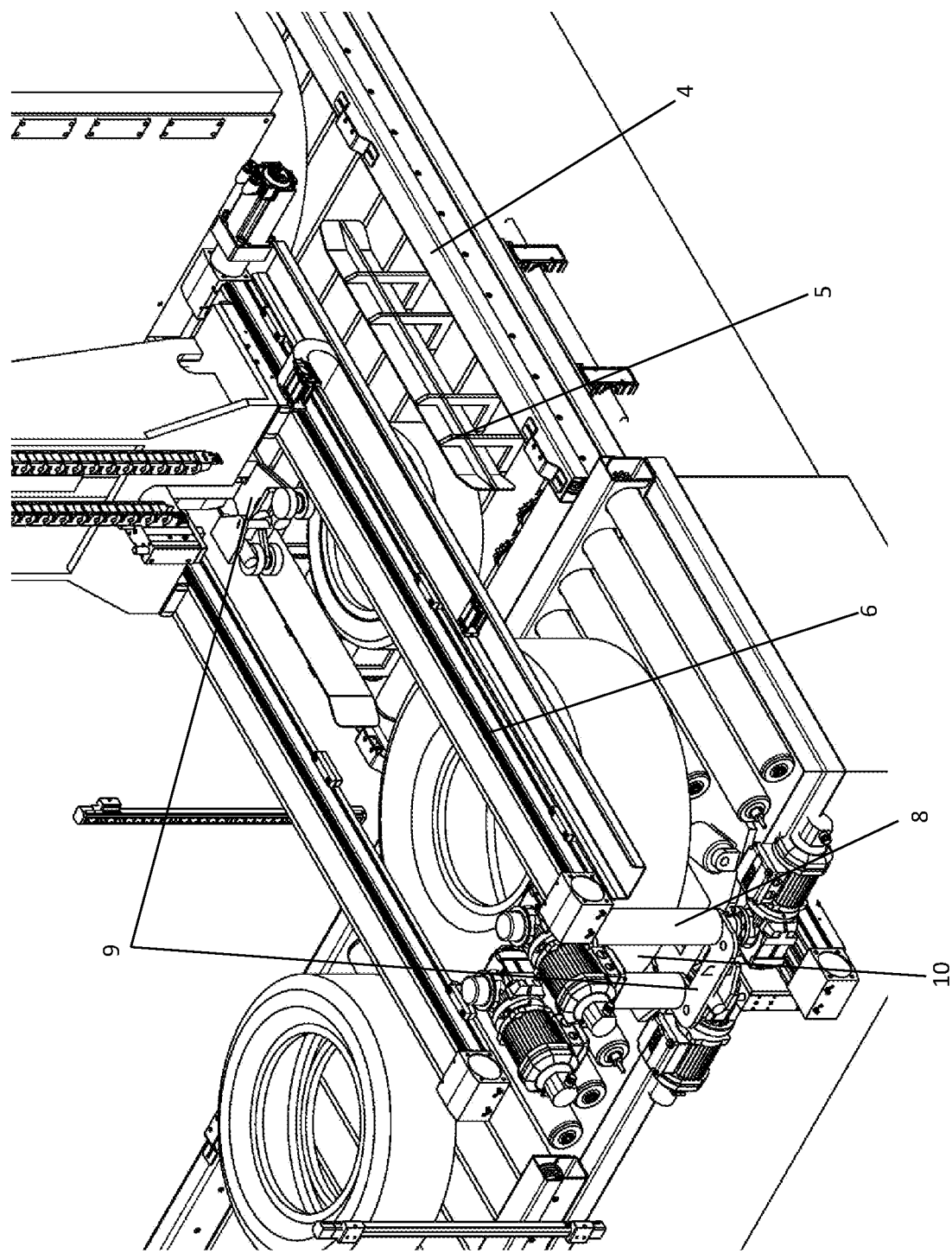
FIG. 3 shows a cutting zone of a machine according to the present invention.

The loading unit 3 of this first tyre sidewall and tread separation unit allows the manual, semi-automatic or automatic feeding of a horizontally arranged tyre to convey it to a sidewall and tread separation unit. This loading unit rests on a structure on which is arranged an elongated linear roller feed table capable of receiving a horizontal tyre. This loading zone 3 has two opposite ends in the lengthwise direction, one downstream end being adjacent to the sidewall separation unit and the other end being able to be linked to an automated feed system (conveyors) or a manual loading zone. This loading zone is made up of two parallel horizontal side rails, between which are fixed perpendicularly, at regular intervals, motorized rollers around a first axis perpendicular to the direction of travel of the tyre. The width of this loading zone 3 is designed to accommodate all sizes of tyre up to 1 m in diameter. To move the tyre through the sidewall separation zone, the motorized rollers convey the tyre under a tyre width measuring device and then through a centring zone that compresses the tyre on both sides, parallel to the side rails supporting the drive rollers. As shown in FIG. 3, once the tyre is centred, a multi-axis frame 6 is inserted into the sidewalls of the tyre to position the support rollers 7 inside the tread and thus automatically drive the tyre against the drive rollers. The support rollers 7 and the knives are mechanically connected or digitally synchronized on their own axes. Once the rotating tyre is in contact with the drive rollers 8, each of which can be rotated at variable and programmable torques and speeds, the knives penetrate the sidewalls tangentially to the tread to perform at least one complete rotation until the sidewalls are separated from the tread. The multi-axis frame is then released from the sidewalls to let the result of the cutting operation leave the cutting zone via a new conveyor system similar to that of the loading zone 3, disposed perpendicularly to the automatic tyre loading direction. The tyre is discharged on the transition belt 11, if this is free. The loading zone, freed up by the cutting operation, is manually or automatically loaded during the automatic work cycle.

Thus, each tyre is processed and the sidewall separation unit provides the second unit with a closed tread without human intervention.

Figure 4:
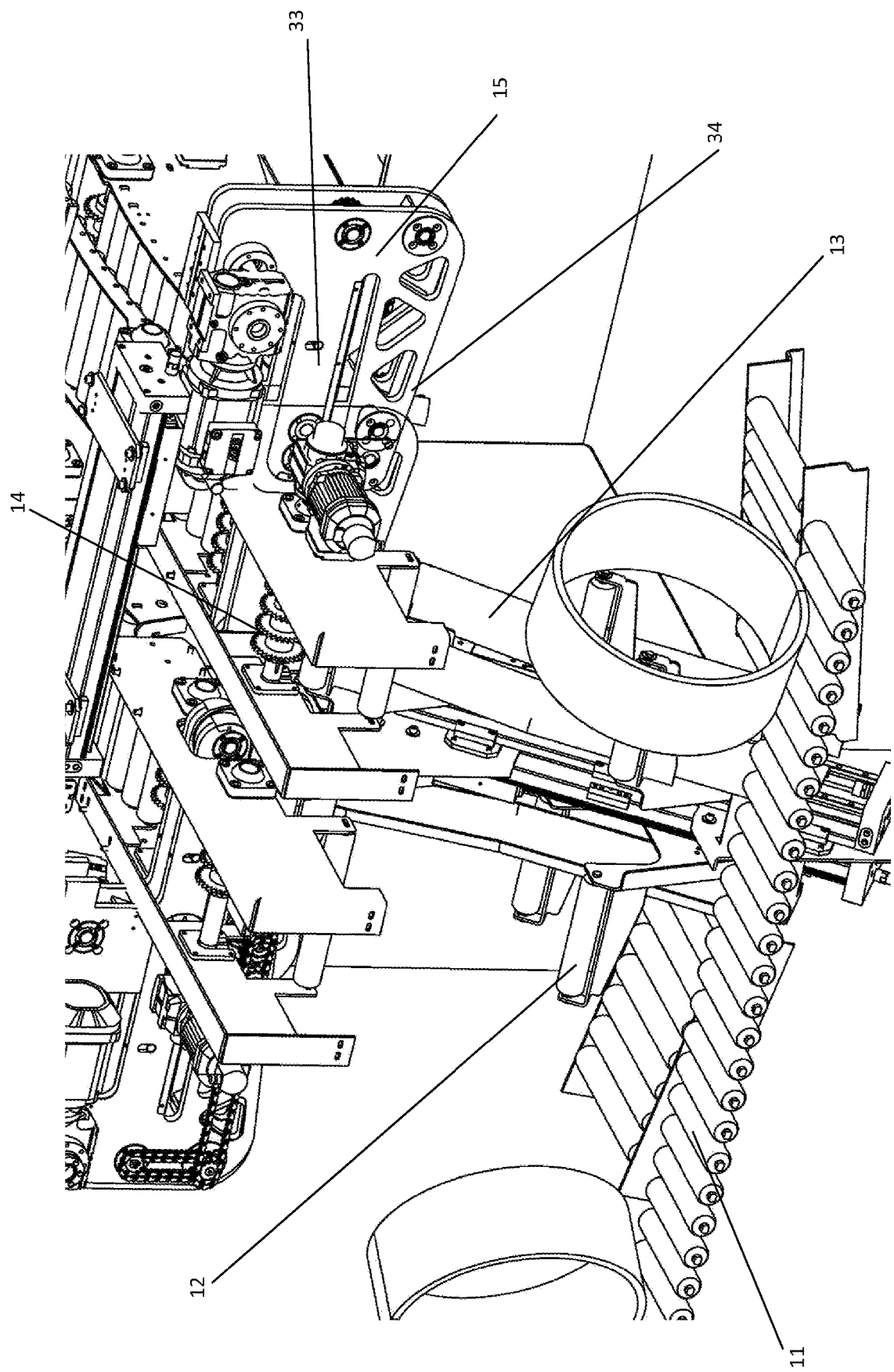
FIG. 4 shows a loading zone of a machine according to the present invention with uncut treads and a device for cross-cutting the tread.
Figure 5:
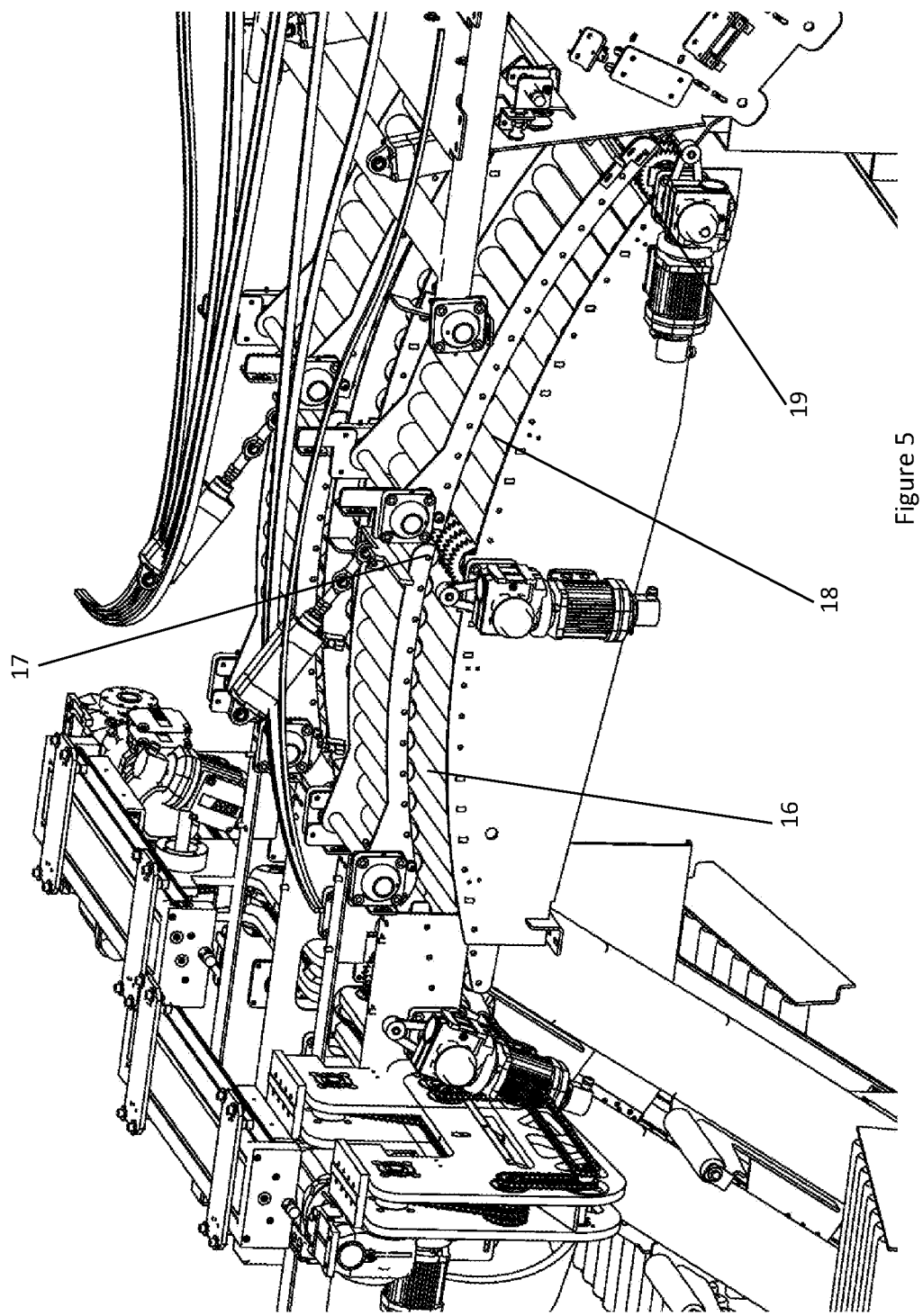
FIG. 5 shows an active tread storage zone.

As shown in FIGS. 4 and 5, the tread is manually fed into the processing unit 2, on support rollers 12, from either side of the processing unit. In this example, once the tread is in place, the cycle is started manually by an operator release. The loading rollers 12 drive the closed tread against the support rollers 14. During the transition, a guide 13 provides adjustable positioning allowing precise positioning of the tread. Once the tread is positioned and held between the rollers 12 and 14, the cross-cutting device 15 separates the tread transversely.

Figure 8:
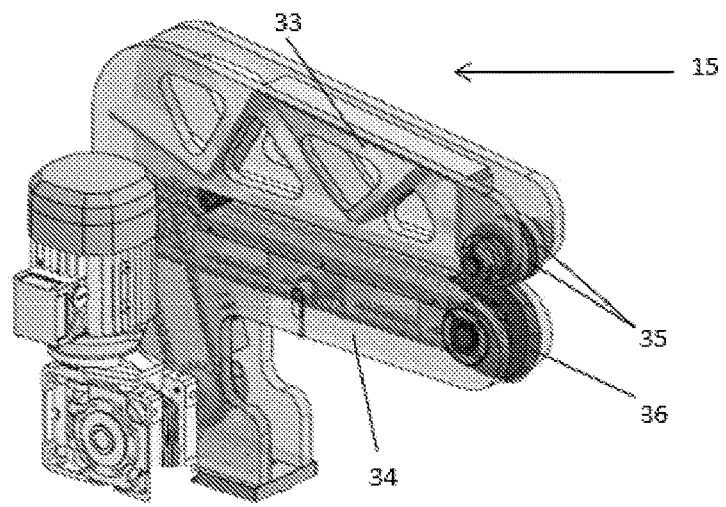
FIG. 8 shows a perspective view of a cross-cutting device.

As can be seen in FIG. 8, the cutting device 15 for the tread 27, when said tread 27 is separated from its sidewalls 32, comprises an upper arm 33 and a lower arm 34, the upper arm 33 or lower arm 34 carrying at one of its ends a pair of coaxial discs 35 spaced apart from each other, the other upper arm 33 or lower arm 34 carrying a substantially circular blade 36 arranged between said discs 35, said cutting device 15 sliding to transversely cut the tread 27 when said tread 27 is separated from its sidewalls 32.

Once cutting is complete, the cutting device 15 acts as a guide and the motorized support rollers 14 separate the downstream part from the upstream part, which is conveyed into an active storage zone up to the guide rollers 16. Depending on the position of the previous tread, the drive rollers 14 and 17 will convey the tread into the guide zones 16 and 18 so as to catch up with the previous tread, thus creating a continuous belt for the processing zone. In this example, the rollers are all angled slightly toward the longitudinal guide zone of the tread. A width sensor activates or deactivates the heads depending on the width of the tread.

Figure 6:
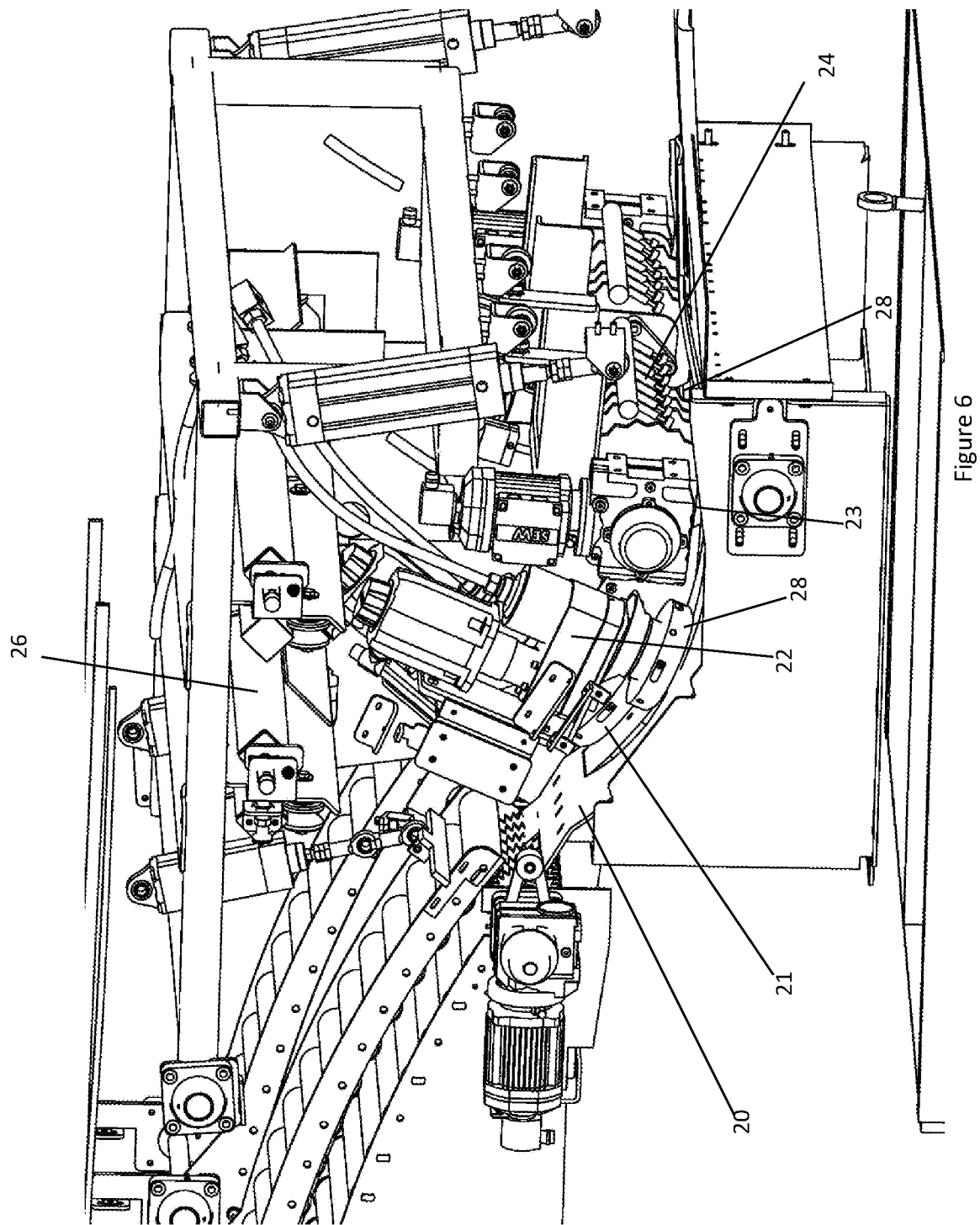
FIG. 6 shows a processing zone of a machine according to the present invention.
Figure 7:
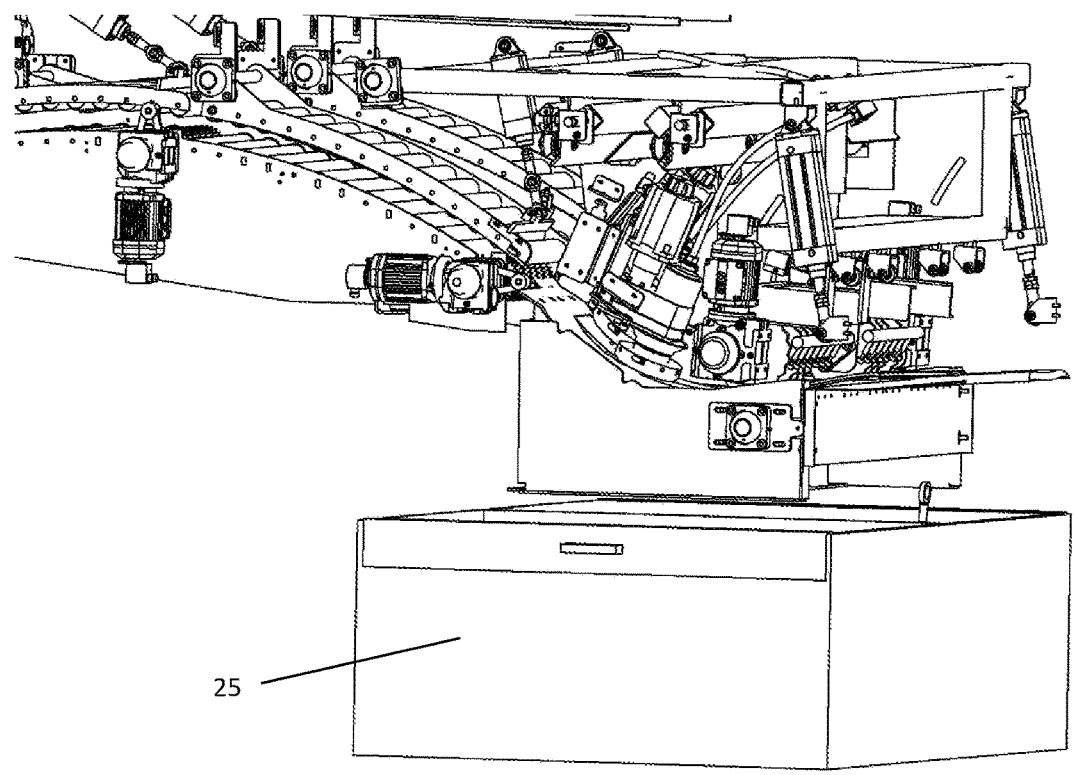
FIG. 7 shows a liquid recovery zone of a machine according to the present invention.

As illustrated in FIGS. 5 and 6, the tread travels at a given, programmable speed under the hydrodemolition heads 22 by means of the drive rollers 19, which push the tread, forcing it to reverse its natural curvature and present an almost flat surface on the rigid supports 21, thus guaranteeing a high yield. This is because the ultra-high-pressure water used in the process to pulverize the rubber of the tread creates a force that pushes the tread towards the jets. On leaving the processing zone, rinsing nozzles clear the belts of powder residue and two rollers 24 ensure that the treads are discharged from the casing 2. The post-processing drive cylinders 24 consist of a stack of toothed wheels, evenly spaced apart in this example, arranged on a rotational axis. The processed tread is automatically discharged by a discharge system and tipped by gravity, for example into a recovery tank (not shown) or onto a conveyor belt (not shown).

As shown in FIG. 1, the processing unit comprises a framework and a sealed casing including all loading, cutting, active storage and processing steps. Thus, the entire kinetic mechanism as well as the processing device are arranged inside a sealed casing. The casing is provided with several doors allowing internal access to the different zones. In its lower part, the casing has a recovery tank 25 and an ad-hoc hydraulic system for removing the water-powder mixture from the processing unit. Discharge of the mixture is actuated by floats controlling the operating levels of the hydraulic unit of the recovery tank 25.

Inside the casing 2, the kinetics mechanism ensures the movement of the tread inside the processing unit. The feed rate of the tread is adjustable. The path travelled by the tread describes an S-shaped curve. Over the entire length of travel, the tread is circumscribed over its entire width in a space delimited on the underside and top of the tread and laterally by the slight slope of the guide and drive rollers 14, 16, 17 and 18. The perimeter profile of the drive rollers is saw-toothed to provide gripping of the tread throughout the transport sequence.

The drive rollers press the tread against free rollers, inducing a tensile force, and are combined with the upper and lower guide rollers with free rollers to guide the tread along its path. The guide rollers are arranged on two side rails, the shape of which is specific to the path of the tread. The width of the roller guides ensures the passage of all sizes of tread.

All zones have release mechanisms for easy maintenance and access in the event of jamming. In addition, the horizontal release of each processing zone allows the hydrodemolition head module to be removed to allow easy access to the various units and controls that make up the system. Arranged on the movable support 26 are two hydrodemolition heads, oriented to be parallel to the rigid supports along the path of the tread. The number of heads can be variable depending on the width of the treads being processed. Each head has its own mechanical adjustments for optimal head positioning.

The hydrodemolition unit 22 consists of an electric motor which rotates the rotational axis of the hydrodemolition head via a gearbox. The rotation speed is adjustable to suit the selected processing. This gearbox allows rotation of the head, while enabling connection to an ultra-high-pressure water supply, coming from the hydraulic pump. This water then flows through the hydrodemolition unit, through the rotational axis, to the hydrodemolition head.

The hydrodemolition head 22 is equipped with specific nozzles for discharging water under ultra-high-pressure with the result that each of the nozzles forms a water jet of very high kinetic energy. The jet hits the surface of the tread being processed and erodes the material in powder form.

The number of active nozzles may vary, depending on the specific processing requirements. They can be positioned anywhere on the surface of the hydrodemolition head. The direction of the jets can be perpendicular to the surface of the hydrodemolition head as well as having an angular orientation. The shape and size of the nozzle outlets are adapted to the type of processing.

The machine further comprises an electrical board with all the electrical components and a digital control system with a control display for fully automated operation of the machine. The ultra-high-pressure hydraulic pump is also controlled by the digital control. The digital control system incorporates all the variable control parameters and all the necessary safety features.

The processing cycle is continuous and the treads can be loaded one after the other on either side of the machine.

The machine is designed to recover the rubber from the treads to obtain a product, in powder form, which can be reused as raw material in the production of various items.

The ultra-high-pressure water used by the machine comes from a standard commercial ultra-high-pressure hydraulic pump, furnished with all the necessary equipment for its operation, adapted to the specific needs of processing with the machine. The latter is connected to the pressurized water distributors of the pump.

In the illustrated example, the hydrodemolition system is integrated in a machine processing a tyre tread after the tyre has been previously cut into three parts, two sidewalls and a tread, cut transversely. In another embodiment not shown, the hydrodemolition system or processing zone can be integrated into another machine that processes, for example, a complete tyre without it first being cut into three parts.

KEY

1. Cutting machine casing
2. Sealed processing machine casing
3. Linear loading and feeding table with rollers
4. Tyre height measurement zone
5. Centring zone
6. Multi-axis frame
7. Counter-support rollers
8. Drive rollers
9. Knives
10. Automatic outlet zone
11. Transition/handling belt
12. Loading rollers
13. Positioning guide
14. Support rollers
15. Cross-cutting device
16. Guide rollers—active storage zone 1
17. Drive rollers—active storage zone 1
18. Guide rollers—active storage zone 2
19. Drive rollers—processing zone
20. Shape inversion zone
21. Counter support—processing zone
22. Hydrodemolition head
23. Cleaning zone 24. Outlet rollers
25. Recovery tank
26. Mobile support
27. Tread
28. Nozzles
29. Drainage zone
30. Automatic control unit
31. Detector cells
32. Tyre sidewalls
33. Upper arm
34. Lower arm
35. Coaxial discs
36. Circular blade

The invention claimed is:

1. A machine for recycling tyres by recovering the tyre tread rubber using water jets, the machine comprising:
    a loading unit configured to load a tyre tread, the loading unit including a support configured to position a tread;
    a processing unit for an elongated tyre tread, the processing unit including a preprocessing zone, a processing zone and a postprocessing zone;
    said preprocessing zone including a first upper module and a first lower module configured to press on either side against each of the faces of a flat, cut tread recovered from the loading unit to convey the cut tread towards the processing zone, and
    said processing zone including a processing module including at least one three-dimensionally displaceable nozzle configured to direct a water jet onto a recovered tread;
    wherein the loading unit is configured to load a tyre with a tread and sidewalls, or to load a tread that is separate from a tyre but not cut into sections, wherein the loading unit has a support configured to position a tyre or an uncut tread;
    wherein the loading unit has an automatic feeding device configured to feed a tyre or tread to a cutting unit, said cutting unit having a sliding cutting device configured to transversely cut a tyre or tread fed to the cutting unit by the automatic feeding device;
    wherein the preprocessing zone further includes motorized guide rollers and presence sensors configured to allow a second tread to catch up with a first tread in such a way as to reduce the space between two treads.

2. The machine according to claim 1, wherein the processing zone includes a curved rigid plate with a curvature which is opposite to the natural curvature of the tread, said curved rigid plate representing an inflection point between the curvature of the preprocessing zone and the postprocessing zone.

3. The machine according to claim 1, wherein the cutting device of the tread, when said tread is separated from its sidewalls, includes an upper arm and a lower arm, the upper arm or lower arm carrying at one of its ends a pair of coaxial disks spaced apart from each other, the other upper arm or lower arm carrying a substantially circular blade arranged between said disks, said cutting device being slidable to transversely cut the tread, when the tread is separated from its sidewalls.

4. The machine according to claim 1, wherein each processing module comprises a nozzle configured to process a specific width of a tread.

5. The machine according to claim 1, comprising a drainage zone configured to recover material eroded from a tread and water sprayed by the nozzle, the drainage zone of the processing unit including a recovery tank.

6. The machine according to claim 1, wherein the loading unit including a cleaning device with projection of a liquid to clean the tread of impurities present on said tread.

7. The machine according to claim 1, wherein the preprocessing zone includes a device configured to heat the tread.

8. The machine according to claim 1, comprising a separation module configured to separate the sidewalls from a tyre.

9. The machine according to claim 8, wherein the separation module to separate the sidewalls of a tyre includes a cleaning device including projection of a liquid to clean the tread (27) of impurities present on said tread (27).

10. The machine according to claim 8, wherein the separation module to separate the sidewalls of a tyre includes a tyre-bead-metallic-wire extractor.

11. The machine according to claim 1, wherein the pressure of the water jets from the nozzles is between 1000 and 3000 bar and wherein the size of the recovered rubber powder is mostly less than 600 micrometres.

12. The machine according to claim 1, wherein the at least one three-dimensionally displaceable nozzle is orientable.

13. A process for recycling tyres by recovering the tyre tread rubber using water jets, the method comprising steps of:
    loading a tyre tread,
    processing an elongated tyre tread using a processing zone including a processing module including at least one three-dimensionally displaceable nozzle configured to direct a water jet onto a recovered tread;
    wherein the step of loading includes loading a tyre including a tread and sidewalls, or loading a tread separated from a tyre but not cut into sections, and positioning a tyre or an uncut tread using a support;
    wherein the step of loading includes the conveyance, using an automatic feeding device, of a tyre or a tread towards a cutting unit including a sliding cutting device and transversal cutting using the cutting device of a tyre or a tread conveyed towards the cutting unit by the automatic feeding device; and
    wherein the step of processing includes preprocessing, using motorized guide rollers and presence sensors, so as to allow a second tread to catch up with a first tread in such a way as to reduce the space between two treads.

14. The process according to claim 13, wherein the at least one three-dimensionally displaceable nozzle is orientable.

15. A rubber powder, wherein the rubber powder is obtained by the process according to claim 13.

* * * * *